United States Patent
Werner

(10) Patent No.: US 9,427,800 B2
(45) Date of Patent: Aug. 30, 2016

(54) DEVICE FOR MEASURING PRESSURES IN A MOLD CAVITY OF A CASTING MOLD THAT CAN BE FILLED WITH MELT, PARTICULARLY A VACUUM DIE-CASTING MOLD

(71) Applicant: KSM Castings Group GmbH, Hildesheim (DE)

(72) Inventor: Michael Werner, Hildesheim (DE)

(73) Assignee: KSM Castings Group GmbH, Hildesheim (DE)

( * ) Notice: Subject to any disclaimer, the term of this patent is extended or adjusted under 35 U.S.C. 154(b) by 0 days.

(21) Appl. No.: 14/850,645

(22) Filed: Sep. 10, 2015

(65) Prior Publication Data

US 2016/0082505 A1   Mar. 24, 2016

(30) Foreign Application Priority Data

Sep. 19, 2014 (DE) .................. 10 2014 113 570

(51) Int. Cl.
| | |
|---|---|
| G01L 19/00 | (2006.01) |
| B22D 17/32 | (2006.01) |
| G01L 7/00 | (2006.01) |
| B22D 17/14 | (2006.01) |

(52) U.S. Cl.
CPC ............... *B22D 17/32* (2013.01); *B22D 17/14* (2013.01); *G01L 7/00* (2013.01); *G01L 19/0007* (2013.01)

(58) Field of Classification Search
None
See application file for complete search history.

(56) References Cited

U.S. PATENT DOCUMENTS

| | | | | |
|---|---|---|---|---|
| 4,843,887 A * | 7/1989 | Engeler | ................... | G01L 23/24 73/114.51 |
| 5,424,249 A * | 6/1995 | Ishibashi | ............. | G01L 19/0084 257/787 |
| 5,533,404 A * | 7/1996 | Wurst | ..................... | B29C 45/77 73/756 |
| 5,744,726 A * | 4/1998 | Maurer | ............... | G01L 19/0038 73/724 |
| 2007/0220982 A1* | 9/2007 | Robinson | ............ | G01L 19/0038 73/700 |

FOREIGN PATENT DOCUMENTS

| | | | | |
|---|---|---|---|---|
| DE | 39 39 728 A1 | 6/1991 | | |
| DE | 195 00 005 A1 | 7/1996 | | |
| DE | 101 40 657 C1 | 11/2002 | | |
| DE | 10252183 A1 | 5/2004 | | |
| EP | 0 600 324 A1 | 6/1994 | | |
| JP | EP 1376090 A1 * | 1/2004 | ......... | G01L 19/0038 |
| WO | WO 2005059495 A1 * | 6/2005 | ............ | B29C 45/77 |
| WO | 2012004192 A1 | 1/2012 | | |

OTHER PUBLICATIONS

German Patent and Trademark Office—Office Action dated Jun. 11, 2015 in German Application No. 10 2014 113 570.9 (with translation of relevant parts).
German Patent and Trademark Office—Decision on Grant dated Sep. 8, 2015 in German Application No. 10 2014 113 570.9 (with translation of relevant parts).

* cited by examiner

*Primary Examiner* — Andre Allen
(74) *Attorney, Agent, or Firm* — Collard & Roe, P.C.

(57) ABSTRACT

A device for measuring pressures in a mold cavity of a casting mold that can be filled with melt, particularly a vacuum die-casting mold, includes a pressure sensor, a measurement channel, and a ring-shaped gap that runs in the axial direction between an inner body and an outer body disposed axially in the inner body. The ring-shaped gap stands in connection with the mold cavity at its one end and in connection with one end of the measurement channel at its other end. The pressure sensor is disposed at the other end of the measurement channel.

27 Claims, 2 Drawing Sheets

DEVICE FOR MEASURING PRESSURES IN A MOLD CAVITY OF A CASTING MOLD THAT CAN BE FILLED WITH MELT, PARTICULARLY A VACUUM DIE-CASTING MOLD

CROSS REFERENCE TO RELATED APPLICATIONS

Applicant claims priority under 35 U.S.C. §119 of German Application No. 10 2014 113 570.9 filed Sep. 19, 2014, the disclosure of which is incorporated by reference.

BACKGROUND OF THE INVENTION

1. Field of the Invention

The invention relates to a device for measuring pressures in a mold cavity of a casting mold that can be filled with melt, particularly a vacuum die-casting mold.

2. Description of the Related Art

DE 10140657 C1 already discloses a device for measuring pressures or a pressure progression in a mold cavity of a casting mold that can be filled with melt, particularly a vacuum die-casting mold, in which measurement channels are disposed in a direct connection with the mold cavity. These channels serve for direct pressure measurement in the mold cavity using a pressure sensor, and can be closed off during the melting, metering and/or mold-filling phase, using pins.

In DE 10140657 C1, it is accurately described that the demands on the quality of parts produced by means of die-casting methods, injection-molding methods or similar methods are constantly increasing. A quality improvement is also achieved by means of the further development of the production methods, wherein comprehensive knowledge of the individual process parameters is of great significance. During a casting process with preceding ventilation or evacuation of the casting mold, knowledge of the pressures that occur in the mold cavity, particularly during the mold-filling process, is an important parameter.

As an example, the importance of mold evacuation is explained in DE 10140657 C1, using the die-casting method. For example, in conventional die-casting, impurities in the cast structure of the parts, related to the method, are known. These impurities, in the form of pores in the die-cast part, occur as the result of enclosed air as well as parting agent and lubricant vapors. A significant reduction in the gas content in the case part is achieved by means of the use of vacuum. In this connection, a partial vacuum acts on the entire mold cavity, including the casting chamber and the material intake pipe, so that air, vapors and gases that occur are drawn off. Metering, filling of the casting chamber, of the casting flow system, and at least of parts of the mold cavity take place.

It is absolutely necessary, however, to detect the pressure conditions directly in the mold cavity in order to establish the amount and the time of the partial vacuum, and to achieve quality assurance.

In DE 39 39 728 A1, a pressure measurement device for die-casting and injection-molding machines is disclosed. Advantageous measurement directly in the mold cavity is pointed out, but because of the expected damage to the sensors, this path is viewed as not being implementable for rough casting operation. For this reason, DE 39 39 728 A1 proposes that the pressure measurement device measures pressures exclusively by way of the casting mold and not directly in the mold cavity. In this connection, the sensor is not exposed to the destructive effect of the melt.

From EP 0 600.324 A1, it is known to measure the pressure in the region of the vacuum valve. In this connection, the pressure sensor is protected ahead of the metal front by closing the valve.

From DE 195 00 005 C2, a method and an apparatus for pressure measurement in a die-casting mold or injection-molding mold are known, in which the pressure measurement takes place by way of gaps. In this connection, the gaps are disposed in a metallic permanent mold, perpendicular to the unmolding direction. On the one side, the gaps are connected with the mold cavity directly or by way of an inflow system, and on the other side, they are connected with a pressure sensor, directly or by way of an inflow system. The gaps have almost parallel surfaces. The surfaces that form an individual gap are disposed in part in what is called the furnace side and in part in what is called the ejector side of the permanent mold. It is supposed to be possible to measure pressures that correspond to the pressures in the mold cavity, in almost error-free manner, by way of the gaps that connect the mold cavity with the pressure sensor. In this connection, the measurement channels are closed off by the solidifying metal melt, and the pressure sensor is protected accordingly. In particular, it is supposed to be possible to use the method in aluminum die-casting and zinc die-casting.

In the aforementioned state of the art, closing of measurement channels by means of pins, valves, and solidifying melt is therefore known.

SUMMARY OF THE INVENTION

Proceeding from this state of the art, the invention is based on the task of making an improved device available, which allows a direct pressure measurement in the mold cavity, particularly during the filling process, wherein the pressure sensor is protected from the melt, which device can be retrofitted on existing casting molds with relatively little effort, is configured to be as compact as possible and to have little susceptibility to wear, and can be placed in the most varied casting molds, in as flexible a manner as possible.

This task is accomplished by a device for measuring pressures in a mold cavity of a casting mold that can be filled with melt according to the invention. Further developments and advantageous embodiments of the invention are discussed below.

According to the invention, a device for measuring pressures in a mold cavity of a casting mold that can be filled with melt, particularly a vacuum die-casting mold, is provided, which device comprises a pressure sensor, a measurement channel, and a ring-shaped gap that runs in the axial direction between a coaxial inner and outer body, wherein the ring-shaped gap stands in connection with the mold cavity at its one end, and in connection with one end of the measurement channel at its other end, wherein the pressure sensor is disposed at the other end of the measurement channel.

Such a device, having a ring-shaped gap, makes a direct pressure measurement in the mold cavity possible, particularly during the filling process. The ring-shaped gap, which is formed by the inner and outer body, has proven to be particularly advantageous for solidification in the gap of the melt that enters into the gap. In particular, only little construction space is required in the casting mold for such a device having a ring-shaped gap. In this connection, the inner body and the outer body can form a relatively compact unit in the assembled state, in other words the state forming the gap, and can be produced in simple manner. In existing casting molds, the device according to the invention can be retrofitted with relatively little effort. The required construction space merely has to be created at a suitable location. The device can therefore be placed in the most varied casting molds, in flexible manner.

It can be advantageous if the inner body and/or the outer body have the contour of a cylinder, particularly of a circular cylinder, in the assembled state, in other words the state forming the ring-shaped gap. Such a contour can be advantageous if the unit of inner body and outer body around which the melt flows is not supposed to impair the filling process of the casting mold.

It can be advantageous if the inner body is configured on its outside and the outer body is configured on its inside so that when the mold cavity is filled through the one end of the gap, melt entering into the gap solidifies in the gap and, during this process, travels the shortest possible path in the axial direction.

It can be advantageous if the inner body and the outer body are configured so that the inside and/or outside diameter of the ring-shaped gap, which runs between the bodies in the axial direction, changes one or more times over its axial progression. Thus, the size of the ring-shaped gap or its width and/or the height of the gap can change. Accordingly, the path that the melt can take until it solidifies in the gap, for example, can be adapted to the respective purpose of use. In particular, in this way the dimension of the unit of inner and outer body can be established—also as a function of the purpose of use. In the assembled state of inner and outer body, the gap can essentially be configured to have a uniform height. For specific applications, it can be advantageous if the ring-shaped gap is configured to be wider over its circumference than long in the axial direction. For other applications, it can be advantageous if the ring-shaped gap is configured to be less wide over its circumference than long in the axial direction.

It can be practical if the inner body and the outer body are configured in such a manner that the inside and/or outside diameter of the ring-shaped gap that runs between them in the axial direction is reduced in size over its axial progression from its one end to its other end, preferably in step-like or cascade-like manner. A ring-shaped gap configured in such a manner has proven to be particularly advantageous for solidification in the gap of the melt that enters into the gap. In particular, only little construction space in the casting mold is required for such a device having a ring-shaped gap. In this connection, the inner body and the outer body can form a relatively compact unit in the assembled state, in other words the state that forms the gap, and can be produced in simple manner. In the case of existing casting molds, the device according to the invention can be retrofitted with relatively little effort. The required construction space merely has to be created at a suitable location. The device can therefore be placed in the most varied casting molds, in flexible manner.

It can be advantageous if the casting mold comprises a fixed mold half and a movable mold half. The inner body is disposed on the fixed mold half and the outer body is disposed on the movable mold half, or preferably vice versa, the outer body is disposed on the fixed mold half and the inner body is disposed on the movable mold half. By such a placement, assembling inner and outer body to form the unit that forms the ring-shaped gap is achieved in simple manner, by means of moving the mold halves together and forming the closed casting mold. After casting and solidification of the cast part, the casting mold is opened, wherein the unit of inner and outer body also comes apart. The cast part is subsequently removed together with the material that has solidified in the gap, particularly ejected. Thereby inner and outer body are free again for the next evacuation or casting cycle, in accordance with the mold halves.

In order for outer and inner body to be assembled in defined manner to form the ring-shaped gap, it can be practical if the movement of the mold halves takes place in a direction parallel to the axis of the inner and outer body.

It can be advantageous if, in the moved-together state of the mold halves, the inner body is disposed in defined manner, at least in part, in the outer body, to form the ring-shaped gap. It is therefore unnecessary to dispose the inner body entirely in the outer body to form the ring-shaped gap. The only thing that is important is that such a ring-shaped gap is formed between at least a part of the inner body and outer body.

It can be advantageous if the outer body is configured in bell-like manner on its inside and the inner body is configured in cone-like or pyramid-like manner on its outside. Accordingly, inner and outer body can be separated from one another in the unmolding direction, simply.

It can be advantageous if the outer body has a surface that surrounds the opening for accommodating the inner body, which surface is set onto a surface of the inner body and/or onto a surface of the mold half having the inner body when the casting mold is closed and the inner body is accordingly accommodated in the outer body, wherein the join between the surfaces forms the connection of the mold cavity to the one end of the ring-shaped gap. The connection is accordingly configured in ring shape and is part of the gap. In this regard, the melt can advantageously flow into the gap over the full circumference of the connection.

In order to influence the manner of melt flow that enters into the gap or the melt stream that enters into the gap, it can be advantageous if the width of the join and thereby the distance between the surfaces is different, at least in part, over the circumference.

It can be advantageous if the inner body or the outer body or both are configured as replaceable inserts and connectable with the corresponding mold half. The replaceable inserts can also be insert parts that can be connected with mold inserts of the mold halves. As a result of the replaceability, worn inner and/or outer bodies can simply be replaced with new parts, without the mold halves or mold inserts as a whole having to be replaced. As a result, the useful lifetime of the casting mold as a whole can be increased. In order to increase the useful lifetime of inner and outer body, it can also be advantageous to produce regions subject to greater wear from a material that is less susceptible to wear and/or to makes these regions separately replaceable.

For replacing inner and/or outer body, it can be practical if the inner and/or the outer body has an axial bore for an attachment means, particularly a screw, with which the inner and/or the outer body is to be attached to the corresponding mold half provided with a bore.

It can be advantageous if an axial bore for the attachment means simultaneously forms at least a part of the measurement channel. In this way, it is advantageously possible to do without an additional bore.

It can be advantageous if one part of the measurement channel is disposed in one mold half and a further part of the measurement channel is disposed in the outer body and/or preferably in the inner body. In this way, the pressure sensor can be disposed at a greater distance from inner and/or outer body. In this regard, it can be advantageous if the pressure sensor is attached at one end of the measurement channel or on the movable or fixed mold half.

It can be advantageous if the attachment means, particularly the underside of the head of a screw, is configured so that the connection of the bore disposed in the inner and/or outer body or of the measurement channel with the other end of the ring-shaped gap is ensured.

It can be advantageous if a ring-shaped cover disk provided with a bore, in the manner of a washer, is provided between attachment head, particularly screw head, and the surface that has the bore, and is configured in such a manner that the connection of the bore disposed in the inner and/or outer body or of the measurement channel with the other end of the ring-shaped gap is ensured.

It can be practical if the cover disk has elevations on its underside facing the bore, so that the recesses between the elevations ensure the connection of the bore disposed in the inner and/or outer body or the measurement channel with the other end of the ring-shaped gap.

It can be advantageous if the ring-shaped gap is disposed in such a manner that no gases are drawn out of the mold cavity by way of the gap.

It can be advantageous if the device is provided only for measuring pressures in the mold cavity.

It can be advantageous if the part of the device that has the inner and outer body is disposed in the mold cavity, particularly between two casting runners. Such an arrangement allows direct measurement of the pressure in the mold cavity, without any impairment of the part to be cast being expected.

It can be advantageous if the inner body and/or the outer body can be tempered. During entry of the melt into the gap and the further progression, the melt gives off heat to the walls of the inner and outer body, until the melt solidifies in the ring-shaped gap. The heat exchange can be influenced by means of tempering. Tempering can occur, for example, by way of corresponding coolant bores disposed in the inner and/or outer body, with coolant being passed through accordingly. Further tempering possibilities are known to a person skilled in the art.

The heat exchange can also be influenced separately or furthermore by way of heat-conductive materials provided for the inner and/or outer body, possibly different materials.

Depending on the application case, steel, a copper alloy, tungsten and/or a molybdenum alloy can be used as suitable materials for the inner and outer body.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

When the same reference numbers are used in FIGS. 1 to 5, these reference numbers refer to the same parts, so that for the purpose of avoiding repetition, individual parts do not need to be discussed again in every figure description.

Figure 1:
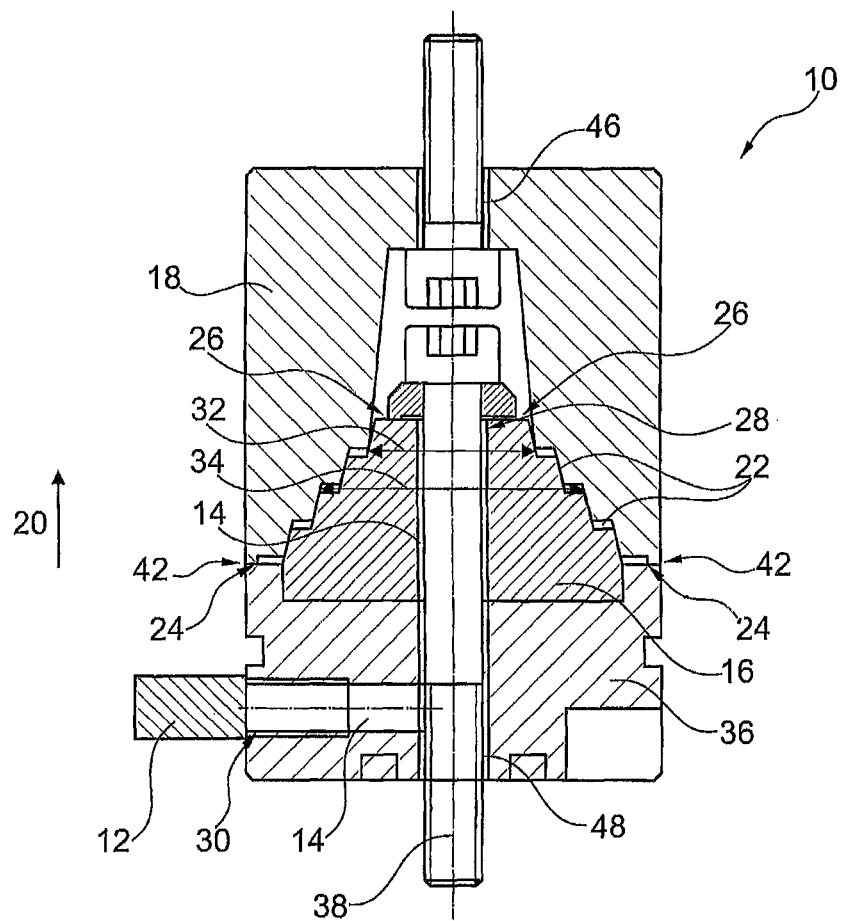
FIG. 1 is a schematic sectional representation through the device according to the invention, with the vacuum die-casting mold closed.
Figure 2:
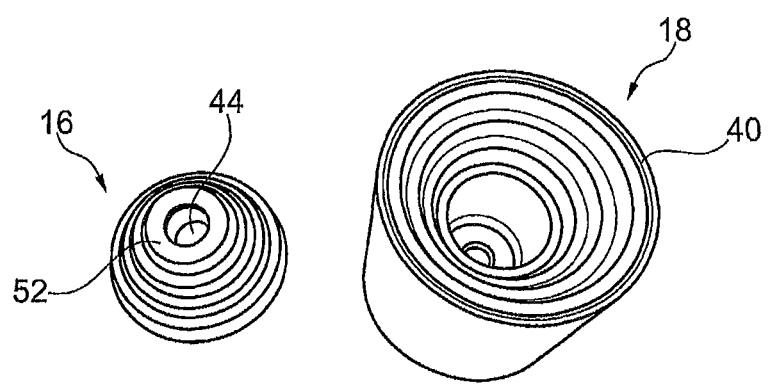
FIG. 2 is a perspective view of the inner and the outer body in the disassembled state.
Figure 3:
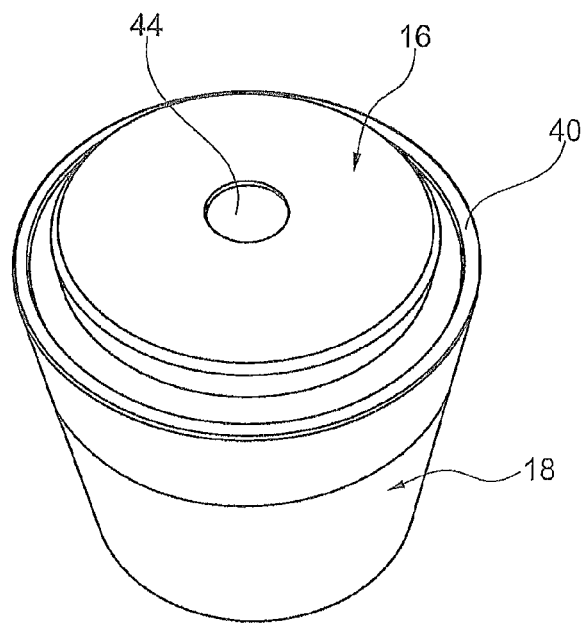
FIG. 3 is a perspective view of the inner and the outer body in the assembled state.
Figure 4:
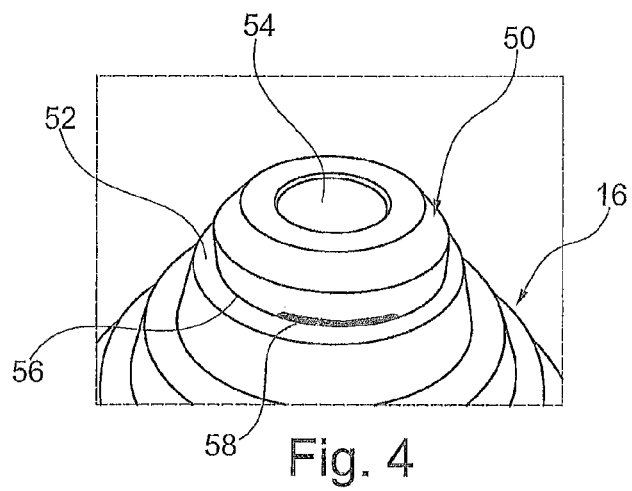
FIG. 4 is a perspective view of the cover disk situated on the inner body.
Figure 5:
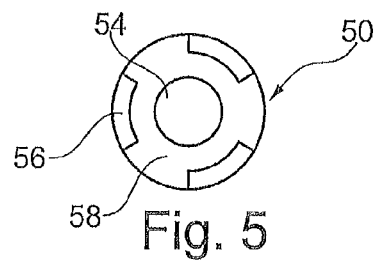
FIG. 5 is a schematic representation of the underside of the cover disk.

In FIG. 1, a section through the device 10 for measuring pressures in a mold cavity of a closed vacuum die-casting mold that can be filled with melt is shown schematically.

The device 10 comprises a pressure sensor 12, a measurement channel 14, and a ring-shaped gap 22 that runs in the axial direction 20 between an outer body 18 and an inner body 16 that is disposed coaxially in the outer body 18, at least in part.

The ring-shaped gap 22 stands in connection with the mold cavity at its one end 24, and in connection with an end 28 of the measurement channel 14 at its other end 26. The pressure sensor 12 is disposed at another location of the measurement channel 14 or at the other end 30 of the measurement channel 14, as close as possible to the gap.

The mold cavity, not shown in any greater detail here, encloses the outer body 18.

The inner body 16 is configured, on its outside, and the outer body 18 is configured, on its inside, in such a manner that the melt that enters into the gap 22 when the mold cavity is filled through the one end 24 of the ring-shaped gap 22 solidifies in the gap 22.

The inner body 16 and the outer body 18 are configured in such a manner that the inside diameter 32 and/or outside diameter 34 of the ring-shaped gap 22 that runs between them in the axial direction 20 changes multiple times over its axial progression, advantageously—as shown—is reduced in size from its one end 24 to its other end 26, namely preferably in step-like manner or cascade-like manner.

The die-casting mold, which is not shown in its entirety here, comprises a fixed mold half, not shown here, and a movable mold half 36, wherein the outer body 18 is disposed on the fixed mold half, and the inner body 16 is disposed on the movable mold half 36.

The movement of the mold half 36 takes place in a direction parallel to the axis 38 of the inner body 16 and outer body 18.

In the moved-together state of the mold halves 36, the inner body 16 is disposed in defined manner, at least in part in the outer body 18.

The outer body 18 is configured in bell-like manner on its inside, and the inner body 16 is configured in cone-like or pyramid-like manner on its outside.

The outer body 18 has a surface 40 (FIG. 2) that surrounds the opening for accommodating the inner body 16, which surface is set onto a surface of the inner body 16 and/or onto a surface of the mold half 36 having the inner body 16 when the casting mold is closed and the inner body 16 is accordingly accommodated in the outer body 18, wherein the join 42 between the surfaces forms the connection of the mold cavity to the one end 24 of the ring-shaped gap 22.

The inner body 16 or the outer body 18 or both are configured as replaceable inserts or insert parts, and can be connected with the corresponding mold half 36 or mold insert.

The inner body 16 or the outer body 18 or both have an axial bore 44, 46, respectively, for an attachment means, particularly a screw, with which the inner body 16 and/or the outer body 18 is to be attached to the corresponding mold half 36 provided with a bore 48 or mold insert.

The axial bore 44 present in the inner body 16 as well as the bore 48 present in the mold half 36 for the attachment means simultaneously form at least a part of the measurement channel.

A ring-shaped cover disk 50 (FIG. 4) in the manner of a washer, provided with a bore 54, is provided between attachment head, particularly screw head, and the surface 52 that has the bore 44, and is configured in such a manner that the connection of the bore 44 disposed in the inner body 16 and/or outer body or of the measurement channel 14 with the other end 26 of the ring-shaped gap 22 is ensured.

The cover disk 50 has elevations 56 on its side facing the bore 44 of the inner body, in such a manner that the recesses 58 between the elevations 56 ensure the connection of the bore 44 disposed in the inner body 16 and/or outer body or of the measurement channel 14 with the other end 26 of the ring-shaped gap 22.

The pressure sensor 12 disposed at the one end 28 of the measurement channel 14 is attached to the movable mold half 36.

Although only a few embodiments of the present invention have been shown and described, it is to be understood that many changes and modifications may be made thereunto without departing from the spirit and scope of the invention.

What is claimed is:

1. A device for measuring pressures in a mold cavity of a casting mold fillable with melt comprising:
    (a) a pressure sensor;
    (b) a measurement channel having first and second measurement channel ends;
    (c) an inner body;
    (d) an outer body disposed axially to the inner body; and
    (e) a ring-shaped gap running in an axial direction between the inner body and the outer body;
    wherein the ring-shaped gap has a first end adapted to stand in connection with the mold cavity and a second end connected with the first measurement channel end; and
    wherein the pressure sensor is disposed at the second measurement channel end.

2. The device according to claim 1, wherein the casting mold is a vacuum die-casting mold.

3. The device according to claim 1, wherein at least one of the inner body and the outer body has a cylindrical contour in an assembled state forming the ring-shaped gap.

4. The device according to claim 1, wherein at least one of the inner body and the outer body has a contour of a circular cylinder in an assembled state forming the ring-shaped gap.

5. The device according to claim 1, wherein the ring-shaped gap has an inside diameter and an outside gap and the inner body and the outer body are configured so that at least one of the inside diameter and the outside diameter of the ring-shaped gap changes at least once over an axial progression of the ring-shaped gap between the inner body and the outer body.

6. The device according to claim 5, wherein the inner body and the outer body are configured so that at least one of the inside diameter and the outside diameter of the ring-shaped gap is reduced in size over the axial progression from the first end to the second end.

7. The device according to claim 6, wherein at least one of the inside diameter and the outside diameter is reduced in size in a stepped or cascaded manner.

8. The assembly according to claim 1, wherein at least one of the inner body and the outer body is tempered.

9. An assembly comprising:
    a casting mold comprising a first mold half and a second mold half, wherein the first mold half is a fixed mold half and the second mold half is a movable mold half or the first mold half is a movable mold half and the second mold half is a fixed mold half; and
    a device for measuring pressures in a mold cavity of the casting mold fillable with melt comprising:
    (a) a pressure sensor;
    (b) a measurement channel having first and second measurement channel ends;
    (c) an inner body disposed on the first mold half;
    (d) an outer body disposed on the second mold half axially to the inner body; and
    (e) a ring-shaped gap running in an axial direction between the inner body and the outer body;
    wherein the ring-shaped gap has a first end connected with the mold cavity and a second end connected with the first measurement channel end; and
    wherein the pressure channel is disposed at the second measurement channel end.

10. The assembly according to claim 9, wherein movement of the mold halves takes place in a direction parallel to an axis of the inner body and the outer body.

11. The assembly according to claim 9, wherein in a moved-together state of the mold halves, the inner body is disposed in defined manner, at least in part, in the outer body.

12. The assembly according to claim 11, wherein the outer body is configured in a bell-shaped manner on an inside of the outer body and the inner body is configured in a cone-shaped or pyramid-shaped manner on an outside of the inner body.

13. The assembly according to claim 11, wherein the outer body has a first surface that surrounds an opening for accommodating the inner body, wherein the first surface is set onto a second surface selected from the group consisting of an inner body surface of the inner body and a mold half surface of the mold half of the first and second mold halves having the inner body when the casting mold is closed and the inner body is accordingly accommodated in the outer body, wherein a join between the first and second surfaces forms a connection of the mold cavity to the first end of the ring-shaped gap.

14. The assembly according to claim 13, wherein the join has a width differing at least in part over a circumference of the ring-shaped gap and thereby a distance between the first and second surfaces is different, at least in part, over the circumference.

15. The assembly according to claim 9, wherein at least one of the inner body and the outer body is configured as a replaceable insert connectable with a corresponding mold half.

16. The assembly according to claim 15, wherein at least one of the inner body and the outer body has an axial bore for an attachment device for attaching the inner body or the outer body to the corresponding mold half provided with a mold half bore.

17. The assembly according to claim 16, wherein the attachment device is a screw.

18. The assembly according to claim 16, wherein the axial bore simultaneously forms at least a part of the measurement channel.

19. The assembly according to claim 9, wherein a first part of the measurement channel is disposed in the first mold half and a second part of the measurement channel is disposed in at least one of the outer body and the inner body.

20. The assembly according to claim 19, wherein the second part is disposed in the inner body.

21. The assembly according to claim 16, wherein the attachment device is configured so that a connection of the bore or of the measurement channel with the second end of the ring-shaped gap is ensured.

22. The assembly according to claim 16, further comprising a ring-shaped cover disk provided with a cover disk bore disposed between an attachment head and a surface of the at least one of the inner body and the outer body that has the axial bore and configured so that a connection of the axial bore or of the measurement channel with the second end of the ring-shaped gap is ensured.

23. The assembly according to claim 22, wherein the cover disk has elevations on an underside of the cover disk facing the axial bore so that recesses between the elevations ensure the connection of the bore or of the measurement channel with the second end of the ring-shaped gap.

24. The assembly according to claim 16, wherein the pressure sensor is attached at the first measurement channel end or on the first or second mold half.

25. The assembly according to claim 9, wherein the ring-shaped gap is disposed so that no gases are drawn out of the mold cavity by way of the gap.

26. The assembly according to claim 9, wherein at least a part of the device that has the inner and outer body is disposed in the mold cavity.

27. The assembly according to claim 26, wherein the part of the device is disposed between first and second casting runners.

* * * * *